(12) United States Patent
Franke et al.

(10) Patent No.: US 8,866,426 B2
(45) Date of Patent: Oct. 21, 2014

(54) INTEGRATED CIRCUIT FOR CONTROLLING AN ELECTRIC MOTOR

(75) Inventors: Jörg Franke, Freiburg (DE); Klaus Heberle, Emmendingen (DE)

(73) Assignee: Micronas GmbH, Freiburg I.Br. (DE)

( * ) Notice: Subject to any disclaimer, the term of this patent is extended or adjusted under 35 U.S.C. 154(b) by 894 days.

(21) Appl. No.: 12/463,668

(22) Filed: May 11, 2009

(65) Prior Publication Data

US 2009/0278531 A1 Nov. 12, 2009

(30) Foreign Application Priority Data

May 9, 2008 (EP) .................................... 08008718

(51) Int. Cl.
*H02K 29/08* (2006.01)
*H02P 6/16* (2006.01)

(52) U.S. Cl.
CPC ................ *H02P 6/165* (2013.01); *H02K 29/08* (2013.01); *Y10S 388/9075* (2013.01)
USPC .................... 318/400.38; 388/907.5

(58) Field of Classification Search
USPC ........... 318/400.38, 432, 798, 799; 388/907.5
See application file for complete search history.

(56) References Cited

U.S. PATENT DOCUMENTS

| | | | |
|---|---|---|---|
| 3,522,494 A | 8/1970 | Bosch | |
| 4,074,173 A | 2/1978 | Janssen | |
| 4,338,558 A * | 7/1982 | Okamatsu et al. | 318/802 |
| 4,459,087 A * | 7/1984 | Barge | 417/356 |
| 4,684,860 A * | 8/1987 | Heyraud et al. | 318/696 |
| 5,619,085 A * | 4/1997 | Shramo | 310/184 |
| 5,845,045 A | 12/1998 | Jeske et al. | |
| 5,847,523 A * | 12/1998 | Rappenecker et al. | 318/434 |
| 6,373,241 B1 * | 4/2002 | Weber et al. | 324/207.2 |
| 6,545,438 B1 * | 4/2003 | Mays, II | 318/400.01 |
| 6,570,353 B2 * | 5/2003 | Krotsch et al. | 318/400.24 |
| 6,707,183 B2 * | 3/2004 | Breynaert et al. | 310/68 B |
| 7,304,450 B2 * | 12/2007 | Prudham | 318/721 |
| 7,893,644 B2 * | 2/2011 | Townsend et al. | 318/565 |
| 2002/0167310 A1 * | 11/2002 | Wallner et al. | 324/207.25 |
| 2003/0011332 A1 * | 1/2003 | Mays, II | 318/254 |
| 2006/0028204 A1 | 2/2006 | Oohira | |

FOREIGN PATENT DOCUMENTS

| | | |
|---|---|---|
| DE | 102005037425 A1 | 2/2006 |
| GB | 2070354 A | 9/1981 |
| JP | 58036160 | 3/1983 |
| JP | 7-194169 | 7/1995 |
| WO | WO 2008/029624 A1 | 3/2008 |

OTHER PUBLICATIONS

Austria Microsystems AG, "Preliminary Data Sheet: Programmable 360° Magnetic Angle Encoder with Absolute SSI and Analog Outputs." Product No. AS5043. pp. 1-26, Apr. 4, 2006.

Freescale Semiconductor, Inc., "Technical Data Sheet: Integrated Quad Half H-Bridge with Power Supply, Embedded MCU, and LIN Serial Communication." Product No. 908E625. pp. 1-48. Sep. 2005. Chandler, Arizona.

* cited by examiner

*Primary Examiner* — Rina Duda (74) *Attorney, Agent, or Firm* — Muncy, Geissler, Olds & Lowe, P.C.

(57) ABSTRACT

An integrated circuit for controlling an electric motor, which has a primary component with a coil and a permanently magnetic secondary component cooperatively connected via an air gap to the primary component, has a semiconductor substrate in which are integrated a microcontroller and/or a pre-amplifier for controlling the coil of the electric motor. For detecting the position of the permanently magnetic secondary component, at least two magnetic field sensors with their measurement axes aligned crosswise relative to each other are integrated in the semiconductor substrate.

17 Claims, 5 Drawing Sheets

INTEGRATED CIRCUIT FOR CONTROLLING AN ELECTRIC MOTOR

BACKGROUND OF THE INVENTION (1) Field of the Invention

The invention relates to an integrated circuit for controlling an electric motor, which has a primary component having a coil and a permanently magnetic secondary component displaceable relative to and cooperatively coupled via an air space to said primary component, with a semiconductor substrate in which is integrated a microcontroller and/or a pre-amplifier for controlling the coil of the electric motor.

(2) Description of Related Art P Such a circuit integrated in a first semiconductor chip is commercially available under the type designation 908E625 from the manufacturer Freescale™ Semiconductor, Inc., Arizona, USA. It has a semiconductor substrate, in which a microcontroller is integrated, which comprises a programmable, nonvolatile memory, a timer, a communication interface, an analog-to-digital converter, and a serial-parallel interface. The first semiconductor chip is arranged in a plastic housing together with a second semiconductor chip, in which are integrated a pre-amplifier and final stage transistors for three half bridges for controlling a three phase coil of an electric motor. For electrical contact, provision is made on the plastic housing for connecting terminals, which are connected to contact sites on the semiconductor chip via contact wires. Three connecting terminals are connected to the three half bridges. The three phase terminals of the coil arranged on the primary component of the electric motor are connected to these connecting terminals. A fourth connecting terminal is connected to the neutral point of the coil. The electric motor has three Hall sensors, which are arranged on the primary component at intervals of 120° and detect the magnetic field of the permanently magnetic pole of the secondary component moving past the Hall sensors. The measurement signal output ports of the Hall sensors are in each case connected to an allocated connecting terminal of the first semiconductor chip. By means of the microcontroller, the given position of the secondary component relative to the first component is determined using the Hall sensor measurement signals, and the coil is controlled relative to the position via the pre-amplifier and the half bridges, in order to generate a relative movement between said primary and said secondary components. The electric drive with the semiconductor chip, however, is still comparatively complex and expensive.

BRIEF SUMMARY OF THE INVENTION

The object is therefore to create an integrated circuit enabling an economical and sturdy electric drive with compact dimensions.

This object is achieved by the integration in the semiconductor substrate of at least two magnetic field sensors with their measurement axes aligned crosswise relative to each other for detecting the position of the permanently magnetic secondary component.

In an advantageous manner, the magnetic field sensors are thus positioned exactly relative to each other in terms of their alignment and the effort in terms of assembly and wiring is considerably simplified in manufacturing the electric motor. Furthermore, integrated circuitry enables a sturdier and more compact drive. The magnetic field sensors can be Hall sensors, magnetoresistive sensors, or giant magnetoresistive sensors.

In a preferred embodiment of the invention, the magnetic field sensors are vertical or diagonal Hall sensors. Preference is given to alignment of the magnetic field sensors with their measurement axes at right angles relative to each other.

It is advantageous if at least one magnetic field sensor is a vertical or diagonal Hall sensor and at least one other magnetic field sensor is a horizontal Hall sensor. The magnetic field sensor can then have another alignment relative to the electric motor, thus making an even more compact electric drive possible.

In another advantageous embodiment of the invention, provision is made in the vicinity of at least one magnetic field sensor on and/or in the semiconductor substrate for deflection means for the magnetic flux of the permanently magnetic secondary component. The deflection means can have a magnetically conductive layer, which deflects the magnetic flux in another direction. In this way it is possible, with Hall sensors arranged in the same planes and/or in planes aligned parallel relative to each other, to measure magnetic fields aligned in crosswise directions, in particular at right angles, relative to each other, for example, along x, y, and z axes.

In an advantageous embodiment of the invention, the microcontroller comprises a position governor, a speed governor, and/or a torque governor for the electric motor. Preference is given to creation of the governor in the form of a suitable software operating program in the microcontroller. The operating program can be stored in a nonvolatile program memory. The electric drive comprising the integrated circuit and the electric motor then allows even more compact dimensions. By suitably programming the program memory, the integrated circuit can be readily adapted to various electric motors.

It is advantageous if the microcontroller has receivers connected to measurement signal output ports of the magnetic field sensors, if the microcontroller is configured to generate a number of preferably sinusoid signals phase-displaced relative to each other corresponding to the number of magnetic field sensors, and if the microcontroller for setting the phasing of these signals has a data memory in which are stored sampling points, which for each magnetic field sensor always assign at least one measurement signal value to a value for the phasing of the signals. Using the sampling points stored in the data memory, it is even possible to compensate for measurement errors caused by an excentric alignment of the rotating permanently magnetic poles to the intersection line of the extension planes of the Hall sensors due to assembly and/or manufacturing tolerances. The sampling points can be stored in a volatile memory area of the data memory as combinations of values, in each case consisting of a reference measurement for each magnetic field sensor and at least one value for the phasing. However, it is also possible for the sampling points to be stored in the data memory in the form of a characteristic line and/or a grid, for example, as a mathematical function, for which an algorithm in the form of a program for the microcontroller and optionally coefficients are stored.

In a preferred embodiment of the invention, the integrated circuit has adjustable compensation means for the magnetic field sensors, wherein the microcontroller has a reference value memory in which reference values for the measurement signals are stored, wherein the microcontroller is switchable between an operation mode and a compensation mode, wherein in the compensation mode the electric motor is displaceable by means of the microcontroller into at least one of the reference positions allocated to the reference values, and wherein in the compensation mode the compensation means are control-connected to the microcontroller so that the measurement signals residing on the measurement signal output ports of the magnetic field sensors essentially correspond to the reference values. The integrated circuit can then be calibrated onsite after installation on the electric motor, in order to compensate for manufacturing tolerances of the electric motor, such as tolerances in the dimensions and/or the magnetization of the permanently magnetic secondary component. Furthermore, with the calibration it is possible to compensate for manufacturing tolerances of the integrated circuit. Optionally it is even possible to repeat the calibration while the electric motor is running, for example, at prespecified time intervals and/or as a function of an external command transmitted to the microcontroller, in order to compensate for age-induced changes and/or changes induced by altered ambient conditions to the electric motor and/or the integrated circuit. Optionally a plausibility test can be carried out during the calibration, in which the compensation means are only then adjusted if the settings calculated for them are plausible. During the manufacturing of the integrated circuit, an optional presetting of the compensation means can be carried out in a semiconductor factory in order to compensate for tolerances in the integrated circuit.

Preference is given to the compensation means having means for adjusting the sensitivity of the magnetic field sensors and/or an offset of the measurement signals of the magnetic field sensors. In this way the measurement signals of the magnetic field sensors can be set with greater precision.

It is advantageous if reference values for various disturbance variables are stored in the reference value memory, particularly temperature values, if the integrated circuit has at least one sensor for capturing a disturbance variable measurement, and if the sensor is connected to the reference value memory and/or the microcontroller in such a way that in the compensation mode the magnetic field sensor measurement signals are capable of being calibrated with the reference values allocated to the respective disturbance variable measurement. In this way it is possible to prevent or at least reduce measurement tolerances in the magnetic field sensor output signals caused by changes in physical disturbance variables acting on the integrated circuit and/or the electric motor.

Preference is given to the integrated circuit of the invention being a part of an electric drive, which has an electric motor which in turn has a primary component with a coil and a permanently magnetic secondary component cooperatively coupled via an air gap to and rotatable about an axis of rotation relative to said primary component, wherein the integrated circuit is arranged with its chip plane crosswise to and preferably at right angles to the axis of rotation of the secondary component. In this case preference is given to arrangement of the integrated circuit on the end face of the electric motor. The electric motor can in particular be a brushless DC motor, a DC motor with brushes, an AC or three-phase motor, or a stepping motor.

It is advantageous if a first Hall sensor extends in a first plane and a second Hall sensor extends in a second plane aligned crosswise relative thereto, and if the axis of rotation is arranged in the intersection line of the Hall sensor planes or in the straight projection of the intersection line. Preference herein is given to the semiconductor substrate of the integrated circuit being centered and aligned with its chip plane at right angles to the axis of rotation of the electric motor.

In another advantageous embodiment of the invention a first Hall sensor extends in a first plane and a second Hall sensor extends in a second plane aligned crosswise relative thereto, wherein the axis of rotation is aligned parallel to the intersection line of the Hall sensor extension planes or to the straight projection of the intersection line. The component containing the integrated circuit can thus also be arranged laterally next to the axis of rotation of the electric motor. With this arrangement there is no need for arrangement of electrical components on the axis of rotation, and the installation space in that vicinity can be used for a drive shaft.

The integrated circuit of the invention can also be a part of an electric drive, which has an electric motor with a primary component having a coil and a permanently magnetic secondary component cooperatively coupled by an air gap to and rotatable about an axis of rotation relative to said primary component, wherein the integrated circuit is arranged with its chip plane parallel to the axis of rotation of the secondary component. The integrated circuit can then be arranged in particular on the outer periphery of the electric motor, thus enabling compact dimensions for the electric drive comprising the integrated circuit and the electric motor.

In an advantageous embodiment of the invention, the permanently magnetic primary component has a plurality of first permanently magnetic poles offset relative to each other in the direction of displacement of the relative movement between the primary and secondary components, wherein the primary component is drive-connected to a magnet wheel, which has second permanently magnetic poles offset relative to each other in the peripheral direction, which magnetically cooperate with the magnetic field sensors. The measurement precision for determination of the position of the secondary component relative to the primary component is thus essentially determined by the number of magnet wheel poles. This number can be larger or smaller than the number of permanently magnetic electric motor poles, as needed.

In another advantageous embodiment of the invention the primary component is drive-connected to a gear, which is arranged in the magnetic flux of a magnet so that the magnetic flux flows through the gear work and the magnetic field sensors. Preference herein is given to the teeth facing the magnetic field sensors.

Mention should still be made that a differential signal can be formed from the measurement signals of at least two magnetic field sensors. This can be achieved, for example, by suitably connecting the magnetic field sensors in series. By doing so the measurement becomes less sensitive to disturbances, such as a deviation in the spacing of the magnetic field sensors relative to a permanent magnet generating the magnetic field.

BRIEF DESCRIPTION OF THE DRAWINGS

Illustrative embodiments of the invention are explained in more detail in the following, with reference to the drawing. Shown are.

DETAILED DESCRIPTION OF THE INVENTION

Figure 1:
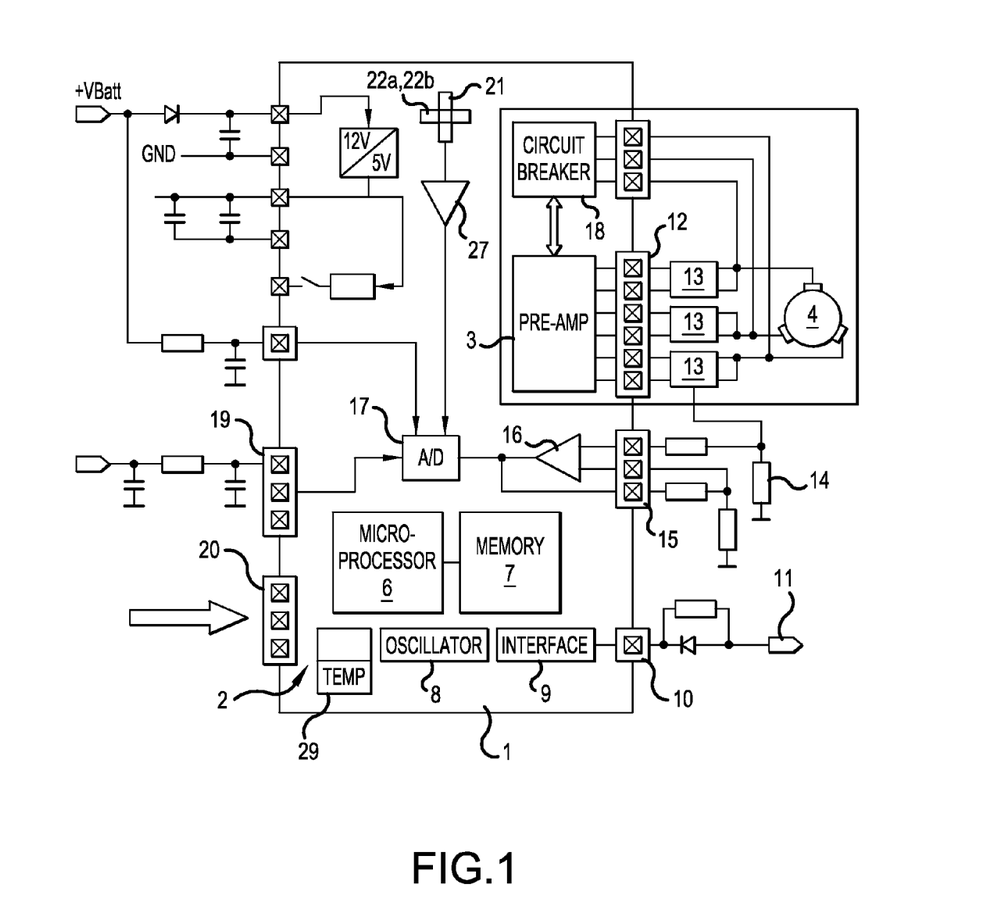
FIG. 1 a block diagram of an integrated circuit for controlling an electric motor wherein the integrated circuit is connected via an end stage to the coil of the electric motor and also to other external electric components, FIG. 2 a first measurement device comprising a first illustrative embodiment of the integrated circuit and a magnet wheel arranged thereon, FIG. 3 a graph of the output signals of Hall sensors, which are components of the integrated circuit, wherein the angle of rotation $\alpha$ of a motor shaft is plotted on the x-axis and the measurement signal $S_x$, $S_y$ is plotted on the y-axis, FIG. 4 a second measurement device comprising a second illustrative embodiment of the integrated circuit and a magnet wheel arranged thereon, and FIG. 5 a third measurement device comprising a third illustrative embodiment of the integrated circuit and a magnet wheel arranged thereon.

An integrated circuit designated in its entirety with 1 in FIG. 1 has a monolithic semiconductor substrate in which are integrated a microcontroller 2 and a pre-amplifier 3 for controlling the coil of the electric motor 4. The integrated circuit 1 is manufactured with a CMOS process and can comprise unipolar, bipolar, and passive components.

The electric motor 4 is configured as a brushless DC motor, which has a primary component with the coil arranged thereon and a permanently magnetic secondary component, which is rotatably mounted about an axis of rotation 5 on the primary component. The secondary component has on its outer periphery a series of permanently magnetic poles, which are offset relative to each other in the peripheral direction and are cooperatively coupled to the coil via an air gap. Other embodiments of the electric motor 4, however, are also conceivable. For example, the electric motor 4 can also be configured as an external rotor or shrunk-on-disc rotor.

In FIG. 1 it can be discerned that the microcontroller 2 has a microprocessor 6 and a memory 7 connected thereto, in which an operating program for the microprocessor 6 and data are stored. The memory 7 has a volatile memory area and a nonvolatile, programmable memory area. The microcontroller 2 in addition has an oscillator 8 for generating an internal clock. Furthermore, the microcontroller 2 has a serial interface 9, which is connected to a bus 11 via a first electrical connection 10.

In FIG. 1 it can be further discerned that the integrated circuit 1 has a second electrical connection 12, via which the pre-amplifier 3 is connected to input ports of an end stage. The end stage has a plurality of power transistor-equipped half bridges 13, which are connected to coil terminals of the electric motor 4 and to a shunt 14. To measure the current in the coil of the electric motor 4, the shunt 14 is connected via a resistor to a third electrical connection 15 of the integrated circuit 1, which leads to a first measurement amplifier 16, which is connected via its output port to a first input port of an analog-to-digital converter 17 integrated in the semiconductor substrate.

The coil terminals are in addition connected to third electrical connectors 12 of the integrated circuit 1, which are coupled to a circuit breaker 18 integrated in the semiconductor substrate. The circuit breaker 18 cooperates with the pre-amplifier 3 so as to block the control signal of the half bridge transistors in the event of an unauthorized operation mode of the half bridges 13. Furthermore, the integrated circuit 1 has digital input ports 19, 20, which are connected to the microprocessor 6 and to the analog-to-digital converter 17.

The integrated circuit 1 is arranged on the primary component in order to detect the position of the permanently magnetic secondary component relative to the primary component. In the semiconductor substrate of the integrated circuit 1 are integrated two magnetic field sensors with their measurement axes orthogonally aligned relative to each other, which are configured as Hall sensors 21, 22a, 22b. The Hall sensors 21, 22a, 22b are arranged in the magnetic field of a round magnet 23, which is rotatably mounted about the axis of rotation 5 and arranged on a motor shaft 24 drive-connected to the secondary component of the electric motor 4.

Figure 2:
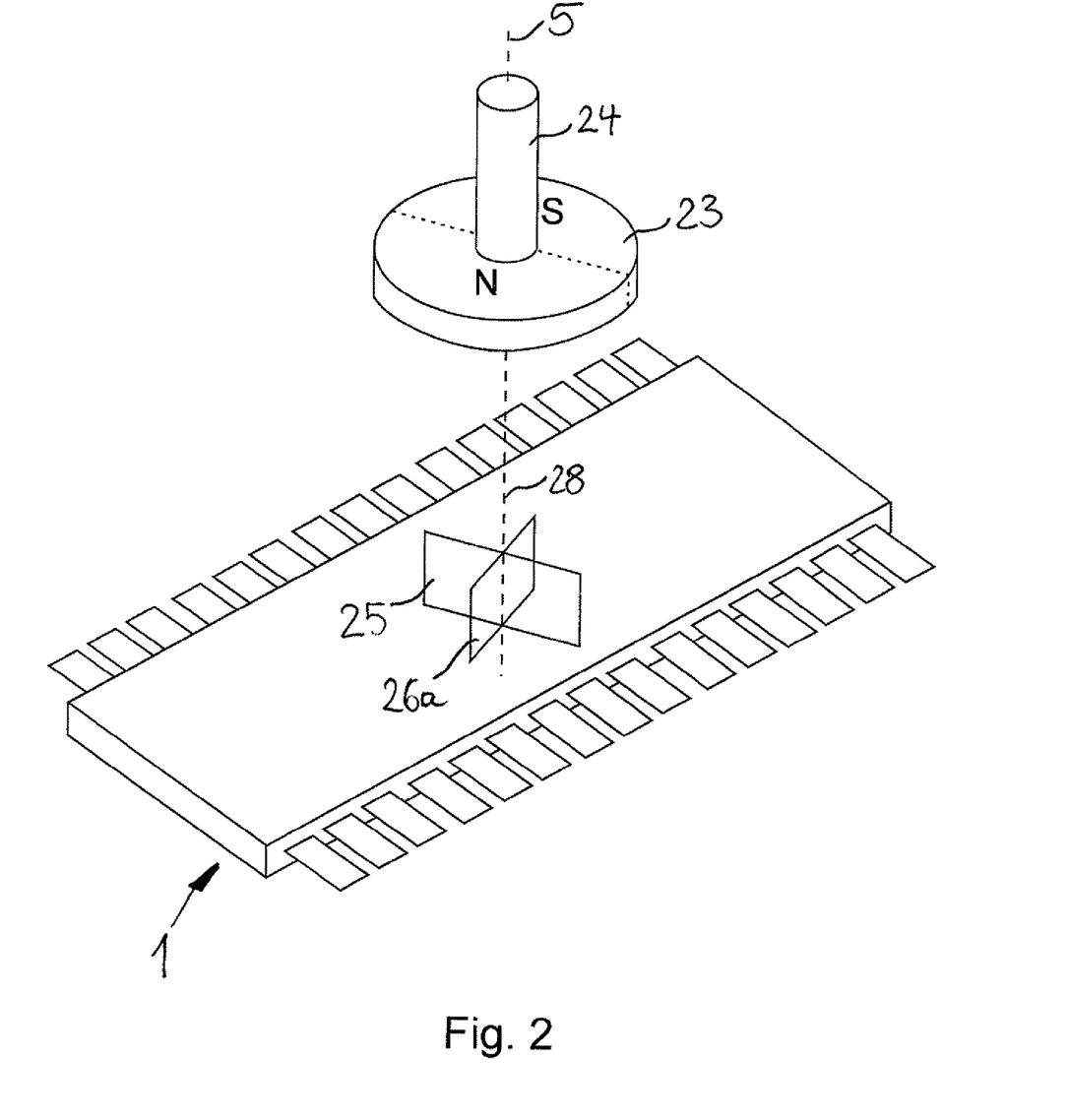

In the illustrative embodiment shown in FIG. 2, both of the Hall sensors 21, 22a are configured as vertical Hall sensors, which are arranged with their planes 25, 26a at right angles relative to each other and at right angles to the chip plane of the semiconductor substrate. It can be clearly discerned that the axis of rotation 5 of the electric motor 4 is arranged in the intersection line 28 of this plane 25. The measurement devices of the Hall sensors 21, 22a are always orthogonally aligned relative to the planes 25, 26a in which the Hall sensors 21, 22a extend. Measurement signal output ports of the Hall sensors 21, 22a are connected via a second measurement amplifier 27 to a second input port of the analog-to-digital converter 17. The output port of the analog-to-digital converter 17 is connected to the microcontroller 2 for processing the measurement signals 21', 22' of the Hall sensors 21, 22a.

Figure 3:
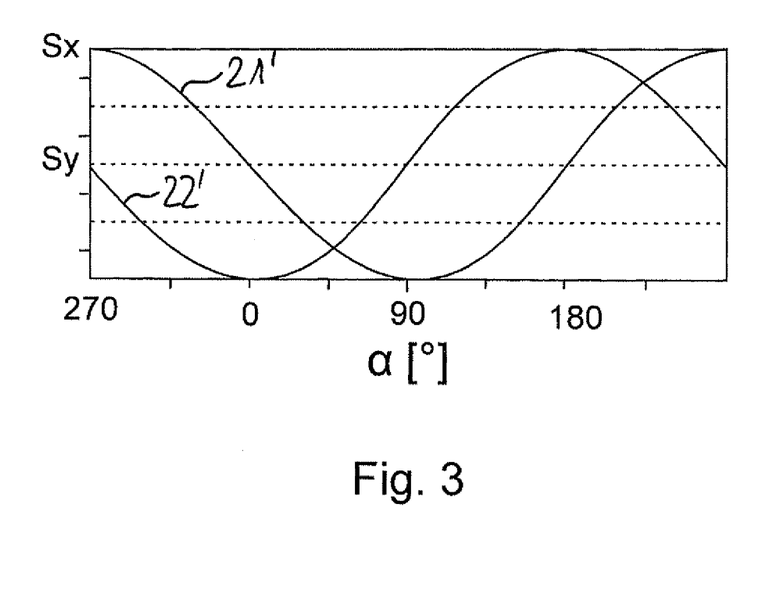

The measurement signals 21', 22' of the Hall sensors 21, 22a are graphed in FIG. 3. It is clearly discernible that the measurement signals 21', 22' are always sinusoid and that the measurement signals 21', 22' are phase displaced relative to each other about a 90° phase angle. With reference to the measurement signals 21', 22' and the parameters stored in the memory 7 for the position of the Hall sensors 21, 22a relative to the primary component, the position of the secondary component relative to the primary component in real time is determined by means of the microcontroller 2. To this end, a suitable operating program for the microprocessor 6 is stored in the memory 6 [sic]. As needed the operating program can also comprise subprograms for governing the position, the speed, and/or the torque of the electric motor 4. The torque is governed as a function of current measurements for the current in the coil of the electric motor 4, which are input via the third electrical connection 15 and the analog-to-digital converter 17 into the microcontroller 2.

Depending on the measurement signals 21', 22' and target values for the position, the speed, and/or the torque of the electric motor 4, in an operation mode of the integrated circuit 1 the coil of the electric motor 4 is electrified via the pre-amplifier 3 and the half bridges 13 in a manner known per se.

Figure 4:
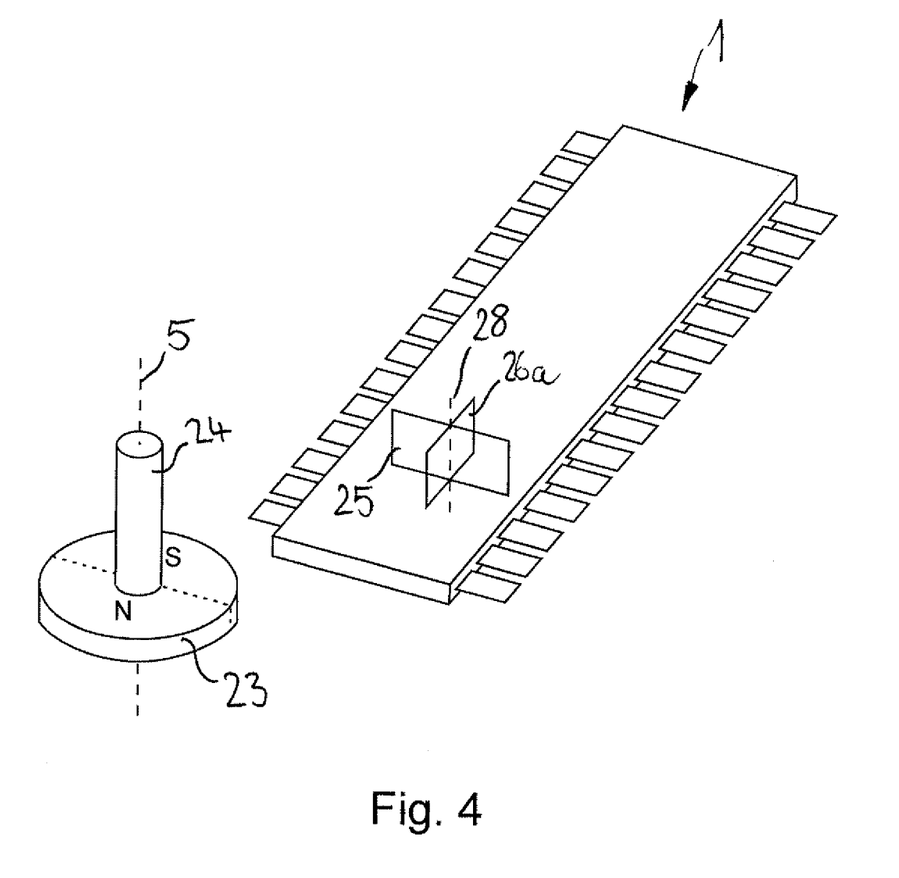

In the illustrative embodiment shown in FIG. 4, the integrated circuit 1 essentially corresponds to the one in FIG. 2. Only the alignment of the vertical planes 25, 26a is different. The axis of rotation 5 of the electric motor is not arranged in the intersection line 28 of the plane 25 of the Hall sensors 21, 22a, instead it is parallelly spaced relative to it. In this way the round magnet 23 can be laterally arranged next to the integrated circuit 1.

Figure 5:
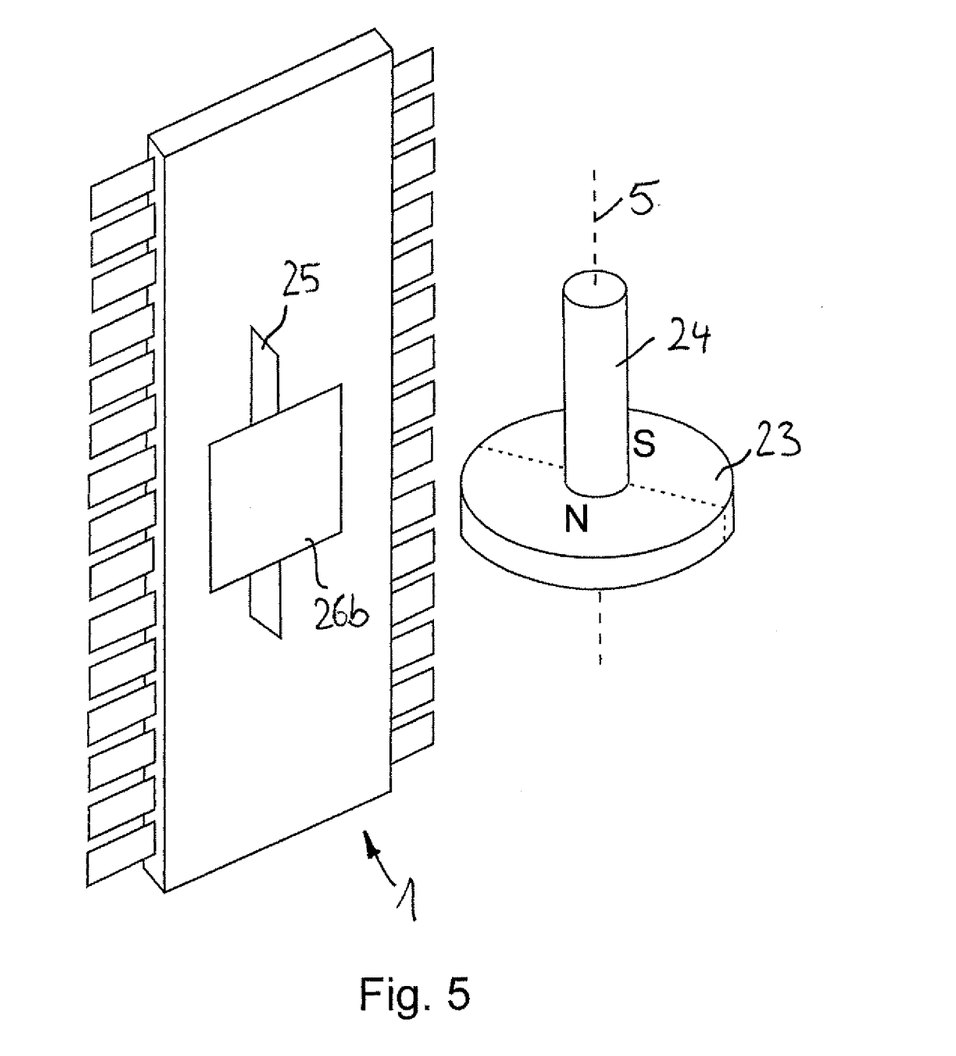

In the illustrative embodiment shown in FIG. 5, the integrated circuit 1 has a vertical Hall sensor 21 and a horizontal Hall sensor 22b. The extension plane 25 of the vertical Hall sensor 21 is aligned at right angles to and the extension plane 26b of the horizontal Hall sensor 22b is aligned parallel to the chip plane of the semiconductor substrate.

The integrated circuit 1 is arranged with its chip plane parallel to the axis of rotation 5 of the secondary component and radially spaced relative to the latter. The surface shell of the round magnet 23 with the magnetic poles faces the chip plane of the integrated circuit 1.

The integrated circuit 1 has adjustable compensation means, which are not shown in detail in the drawing, with which the sensitivity of the Hall sensors 21, 22a, 22b and the offsets of their measurement signals can be set. The compensation means are control-connected to the microcontroller 2. They can be integrated in, for example, the measurement amplifier 27.

Reference values for the measurement signals are stored in the memory 7 for various operating temperatures. For measuring the operation temperature the integrated circuit 1 has a temperature sensor 29, which is connected to the microcontroller 2 for inputting temperature measurements.

By transmission of a command via the bus 11 to the first electrical connection 10, the microcontroller 2 is switchable from the normal operation mode to a compensation mode. In the compensation mode, the electric motor 4 is displaced via the microcontroller 2 into at least one predefined reference position allocated to the reference values. The reference position can be prespecified by, for example, a stop against which the electric motor 4 is positioned.

A temperature measurement from the temperature sensor is then input in the microcontroller 2, and the reference values allocated to the temperature measurement are transferred from the memory 7 into the microcontroller 2.

With the microcontroller, the compensation means are now set so that the measurement signals residing in the measurement signal output ports of the Hall sensors 21, 22a, 22b correspond as closely as possible to the reference values.

After the microcontroller 2 is switched from the compensation mode back to the normal operation mode, the compensation means are operated with the new settings.

The invention claimed is:

1. An integrated circuit for controlling an electric motor, which electric motor has a primary component with a coil and a permanently magnetic secondary component displaceable relative to and cooperatively connected to the primary component via an air gap, the integrated circuit comprising a semiconductor substrate in which are integrated a microcontroller and/or a pre-amplifier for controlling the coil of the electric motor, wherein, for detecting the position of the permanently magnetic secondary component, at least two magnet field sensors with their measurement axes aligned crosswise relative to each other are integrated in the semiconductor substrate, wherein the at least two magnet field sensors and the microcontroller are formed completely within the semiconductor substrate, and wherein at least one of the magnet field sensors is a vertical hall sensor that is formed vertically with respect to an upper surface of the semiconductor substrate.

2. The integrated circuit as in claim 1, wherein the magnetic field sensors are vertical or diagonal Hall sensors.

3. The integrated circuit as in claim 1, wherein at least one magnetic field sensor is a vertical or diagonal Hall sensor and at least one other magnetic field sensor is a horizontal Hall sensor.

4. The integrated circuit as in claim 1, wherein provision is made in the vicinity of at least one magnetic field sensor on and/or in the semiconductor substrate for deflectors for the magnetic flux of the permanently magnetic secondary component.

5. The integrated circuit as in claim 1, wherein the microcontroller comprises a position governor, a speed governor, and/or a torque governor.

6. The integrated circuit as in claim 1, wherein the microcontroller has input ports connected to measurement signal output ports of the magnetic field sensors, that the microcontroller is configured for generating a number of sinusoid signals phase-displaced relative to each other corresponding to the number of the magnetic field sensors, and that the microcontroller has a data memory for adjusting the phasing of these signals, in which are stored sampling points, which for each magnetic field sensor always allocate at least one measurement signal value to a value for the phasing of the signals.

7. An electric drive with an integrated circuit as in claim 1 and an electric motor, which has a primary component having a coil and a permanently magnetic secondary component cooperatively coupled via an air gap to and rotatable about an axis of rotation relative to the primary component, wherein the integrated circuit is arranged with its chip plane crosswise and preferably at right angles to the axis of rotation of the secondary component.

8. The electric drive as in claim 7, wherein a first Hall sensor extends in a first plane and a second Hall sensor extends in a second plane aligned crosswise thereto, and that the axis of rotation is arranged in the intersection line of the planes of the Hall sensors or in the straight projection of the intersection line.

9. The electric drive as in claim 7, wherein a first Hall sensor extends in a first plane and a second Hall sensor extends in a second plane aligned crosswise thereto, and that the axis of rotation is aligned parallel to the intersection line of the planes of the Hall sensors or to the straight projection of the intersection line.

10. The electric drive with an integrated circuit as in claim 1 and an electric motor, which has a primary component having a coil and a permanently magnetic secondary component cooperatively coupled via an air gap to and rotatable about an axis of rotation relative to the primary component, wherein the integrated circuit is aligned with its chip plane parallel to the axis of rotation of the secondary component.

11. The electric drive as in claim 7, wherein the permanently magnetic primary component has a plurality of first permanently magnetic poles offset relative to each other in the direction of displacement of the relative movement between the primary and secondary components, and that the primary component is drive-connected to a magnet wheel, which has second permanently magnetic poles offset relative to each other in the peripheral direction, which magnetically cooperate with the magnetic field sensors.

12. The electric drive as in claim 7, wherein the primary component is drive-connected to a gear, which is arranged in the magnetic flux of a magnet so that the magnetic flux flows through the teeth of the gear and the magnetic field sensors.

13. The integrated circuit according to claim 1, further comprising a temperature sensor connected to the microcontroller for providing temperature measurements.

14. An integrated circuit for controlling an electric motor, which electric motor has a primary component with a coil and a permanently magnetic secondary component displaceable relative to and cooperatively connected to the primary component via an air gap, the integrated circuit comprising:
   a semiconductor substrate in which are integrated a microcontroller and/or a pre-amplifier for controlling the coil of the electric motor, wherein, for detecting the position of the permanent magnetic secondary component, at least two magnet field sensors with their measurement axes aligned crosswise relative to each other are integrated in the semiconductor substrate; and
   adjustable compensation means for the magnetic field sensors, wherein the microcontroller has a reference value memory in which reference values for the measurement signals are stored, the microcontroller is switchable to an operation mode and to a compensation mode, and in the compensation mode the electric motor is displaceable via the microcontroller into at least one reference position allocated to the reference values, and furthermore in the compensation mode the compensation means are control-connected to the microcontroller so that the measurement signals residing in the measurement signal output ports of the magnetic field sensors essentially correspond to the reference values.

15. The integrated circuit as in claim 14, wherein the compensation means have means for adjusting the sensitivity of the magnetic field sensors and/or an offset of the measurement signals of the magnetic field sensors.

16. An integrated circuit for controlling an electric motor, which electric motor has a primary component with a coil and a permanently magnetic secondary component displaceable relative to and cooperatively connected to the primary component via an air gap, the integrated circuit comprising a semiconductor substrate in which are integrated a microcontroller and/or a pre-amplifier for controlling the of the electric motor, wherein, for detecting the position of the permanently magnetic secondary component, at least two magnet field sensors with their measurement axes aligned crosswise relative to each other are integrated in the semiconductor substrate,
  wherein reference values for disturbance variables are stored in the reference value memory,
  wherein the integrated circuit has at least one sensor for capturing a disturbance variable, and
  wherein the sensor is connected to the reference value memory and/or the microcontroller so that in the compensation mode the measurement signals of the magnetic field sensors are calibrated with the reference values allocated to respective ones of said disturbance variables.

17. The integrated circuit according to claim 16 wherein said disturbance variables include temperature variables.

* * * * *